United States Patent
Chen et al.

(10) Patent No.: US 9,553,643 B2
(45) Date of Patent: Jan. 24, 2017

(54) USER EQUIPMENT AND METHODS FOR CODEBOOK SUBSAMPLING FOR ENHANCED 4TX CODEBOOKS

(71) Applicant: Intel IP Corporation, Santa Clara, CA (US)

(72) Inventors: Xiaogang Chen, Beijing (CN); Yuan Zhu, Beijing (CN); Qinghua Li, San Ramon, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/739,815

(22) Filed: Jun. 15, 2015

(65) Prior Publication Data

US 2016/0006493 A1    Jan. 7, 2016

Related U.S. Application Data

(63) Continuation of application No. 14/108,648, filed on Dec. 17, 2013, now Pat. No. 9,071,297.

(Continued)

(51) Int. Cl.
*H04B 7/04* (2006.01)
*H04B 7/06* (2006.01)
(Continued)

(52) U.S. Cl.
CPC .......... *H04B 7/0456* (2013.01); *H04B 7/0452* (2013.01); *H04B 7/0486* (2013.01);
(Continued)

(58) Field of Classification Search
CPC ... H04B 7/0639; H04B 7/0626; H04B 7/0486; H04B 7/0632; H04B 7/0456; H04B 7/0621
See application file for complete search history.

(56) References Cited

U.S. PATENT DOCUMENTS 8,639,198 B2    1/2014    Liu et al.
9,071,297 B2    6/2015    Chen et al.
(Continued)

FOREIGN PATENT DOCUMENTS

| CN | 105144647 A | 12/2015 |
| CN | 105165042 A | 12/2015 |

(Continued)

OTHER PUBLICATIONS

"U.S. Appl. No. 14/108,648, Non Final Office Action mailed Oct. 21, 2014", 8 pgs.

(Continued)

*Primary Examiner* — Jean B Corrielus
(74) *Attorney, Agent, or Firm* — Schwegman Lundberg & Woessner, P.A.

(57) ABSTRACT

Embodiments of user equipment (UE) and methods for codebook subsampling for enhanced 4TX codebooks in 3GPP LTE wireless networks are generally described herein. In some embodiments, a physical uplink control channel (PUCCH) is configured for transmission of channel state information (CSI) feedback including a rank indicator (RI) and a precoding matrix (W1). The rank indicator (RI) and a precoding matrix (W1) are jointly encoded and codebook subsampling is performed for the enhanced 4Tx codebook for at least one of: PUCCH report type 5 (RI/1st PMI) in PUCCH 1-1 submode 1; PUCCH report type 2c (CQI/1st PMI/2nd PMI) in PUCCH 1-1 submode 2; and PUCCH report type 1a (subband CQI/2nd PMI) in PUCCH 2-1.

11 Claims, 1 Drawing Sheet

Related U.S. Application Data

(60) Provisional application No. 61/829,968, filed on May 31, 2013.

(51) Int. Cl.

| | | |
|---|---|---|
| *H04W 12/02* | (2009.01) | |
| *H04W 48/16* | (2009.01) | |
| *H04W 28/02* | (2009.01) | |
| *H04L 27/20* | (2006.01) | |
| *H04W 76/02* | (2009.01) | |

(52) U.S. Cl.
CPC ........... *H04B 7/063* (2013.01); *H04B 7/0617* (2013.01); *H04B 7/0626* (2013.01); *H04B 7/0632* (2013.01); *H04B 7/0639* (2013.01); *H04L 27/20* (2013.01); *H04W 12/02* (2013.01); *H04W 28/0289* (2013.01); *H04W 48/16* (2013.01); *H04W 76/023* (2013.01)

(56) References Cited

U.S. PATENT DOCUMENTS

| | | | |
|---|---|---|---|
| 2010/0118817 A1* | 5/2010 | Damnjanovic | H04L 1/0026 370/329 |
| 2010/0189071 A1 | 7/2010 | Kitazoe | |
| 2010/0268775 A1 | 10/2010 | Doppler et al. | |
| 2011/0098043 A1 | 4/2011 | Yu et al. | |
| 2012/0076028 A1* | 3/2012 | Ko | H04L 1/0026 370/252 |
| 2012/0079019 A1 | 3/2012 | Miettinen et al. | |
| 2012/0079109 A1 | 3/2012 | Klein et al. | |
| 2012/0087425 A1 | 4/2012 | Gomadam et al. | |
| 2012/0093098 A1 | 4/2012 | Charbit et al. | |
| 2012/0218948 A1 | 8/2012 | Onggosanusi et al. | |
| 2012/0219042 A1 | 8/2012 | Onggosanusi et al. | |
| 2012/0220286 A1 | 8/2012 | Chen et al. | |
| 2013/0040677 A1 | 2/2013 | Lee et al. | |
| 2013/0077704 A1 | 3/2013 | Ding et al. | |
| 2014/0086352 A1 | 3/2014 | Ko et al. | |
| 2014/0092885 A1 | 4/2014 | Venkatachalam et al. | |
| 2014/0169300 A1 | 6/2014 | Kim et al. | |
| 2014/0219219 A1 | 8/2014 | Onggosanusi et al. | |
| 2014/0254701 A1 | 9/2014 | Geirhofer et al. | |
| 2014/0286452 A1 | 9/2014 | Gomadam et al. | |
| 2014/0328422 A1* | 11/2014 | Chen | H04B 7/0417 375/267 |
| 2014/0355705 A1 | 12/2014 | Chen et al. | |
| 2014/0357228 A1 | 12/2014 | Luft et al. | |

FOREIGN PATENT DOCUMENTS

| | | |
|---|---|---|
| KR | 1020120031895 A | 4/2012 |
| WO | WO-2007044597 A2 | 4/2007 |
| WO | WO-2014193718 A1 | 12/2014 |
| WO | WO-2014193749 A1 | 12/2014 |

OTHER PUBLICATIONS

"U.S. Appl. No. 14/108,648, Notice of Allowance mailed Feb. 25, 2015", 16 pgs.
"U.S. Appl. No. 14/108,648, Response filed Jan. 21, 2015 to Non Final Office Action mailed Oct. 21, 2014", 13 pgs.
"U.S. Appl. No. 14/141,843, Non Final Office Action mailed Mar. 3, 2015", 17 pgs.
"International Application Serial No. PCT/US2014/039072, International Search Report mailed Sep. 25, 2014", 4 pgs.
"International Application Serial No. PCT/US2014/039072, Written Opinion mailed Sep. 25, 2014", 5 pgs.
"International Application Serial No. PCT/US2014/039313, International Search Report mailed Sep. 26, 2014", 4 pgs.
"International Application Serial No. PCT/US2014/039313, Written Opinion mailed Sep. 26, 2014", 5 pgs.
"3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321 V8.1.0, (Mar. 2008), 30 pgs.
"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.0.0, (Dec. 2010), 53 pgs.
"U.S. Appl. No. 14/141,843, Final Office Action mailed May 12, 2016", 21 pgs.
"U.S. Appl. No. 14/141,843, Non Final Office Action mailed Oct. 8, 2015", 18 pgs.
"U.S. Appl. No. 14/141,843, Response filed Feb. 3, 2016 to Non Final Office Action mailed Oct. 8, 2015", 7 pgs.
"U.S. Appl. No. 14/141,843, Response filed Jul. 1, 2015 to Non Final Office Action mailed Mar. 3, 2015", 7 pgs.
"Application Serial No, PCT/US2014/039072, International Preliminary Report on Patentability mailed Dec. 10, 2015", 7 pgs.
"Application Serial No. PCT/US2014/039313, International Preliminary Report on Patentability mailed Dec. 10, 2015", 7 pgs.
"Taiwanese Application Serial No. 103118240, Office Action mailed Mar. 11, 2016", W/ English Translation, 17 pgs.
"Taiwanese Application Serial No. 103118240, Office Action mailed Jun. 16, 2015", w/ English Translation, 15 pgs.
"Taiwanese Application Serial No. 103118240, Response filed Jun. 14, 2016 to Office Action mailed Mar. 11, 2016", (English Translation of Claims), 11 pgs.
"U.S. Appl. No. 14/141,843, Notice of Allowance mailed Sep. 16, 2016", 14 pgs.
"U.S. Appl. No. 25/141,843, Response filed Aug. 12, 2016 to Final Office Action mailed May 12, 2016", 8 pgs.

* cited by examiner

USER EQUIPMENT AND METHODS FOR CODEBOOK SUBSAMPLING FOR ENHANCED 4TX CODEBOOKS

PRIORITY CLAIM

This application is a continuation of U.S. patent application Ser. No. 14/108,648, filed Dec. 17, 2013, now issued as U.S. Pat. No. 9,071,297, which claims priority under 35 U.S.C. 119(e) to U.S. Provisional Patent Application Ser. No. 61/829,968, filed May 31, 2013, each of which is incorporated herein by reference in its entirety.

TECHNICAL FIELD

Embodiments pertain to wireless communications. Some embodiments relate to multiple-input multiple output (MIMO) codebook subsampling in cellular networks, such as E-UTRAN networks operating in accordance with one of the 3GPP standards for the Long Term Evolution (LTE) (3GPP LTE).

BACKGROUND

Closed-loop MIMO systems typically transmit channel state information from a receiver to a transmitter over a feedback path. The channel state information may be used to employ beamforming to compensate for the current channel conditions increasing signal-to-noise (SNR) levels at the receiver. In some of these conventional systems, a beamforming matrix may be generated at the receiver based on the channel conditions. The beamforming matrix may then be provided to the transmitter as feedback. This feedback consumes bandwidth that might otherwise be available for data traffic. To reduce the overhead associated with this feedback, codewords of a known codebook may be provided instead of an actual beamforming matrix. The codewords may indicate which beamforming matrix is to be used by the transmitter.

In MIMO systems, the size of the codebooks may increase significantly with number of transmit antennas $N_t$ and the number of transmitted data streams $N_s$. In some conventional systems, the size of the codebook may be based on the number of transmit antennas and the number of data streams. This results in a significant increase in feedback.

Thus, there are general needs for MIMO systems and methods for beamforming with reduced feedback. There are also general needs for MIMO systems and methods that make use of smaller codebooks. There are also general needs for MIMO systems and methods that provide improved performance without an increase in feedback.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
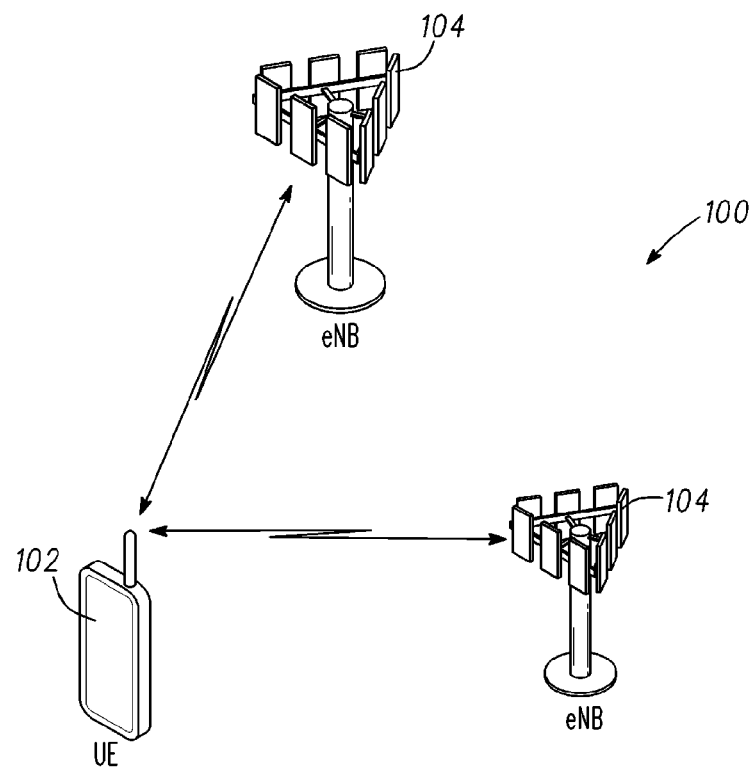
FIG. 1 illustrates a wireless network in accordance with some embodiments.

FIG. 1 illustrates a wireless network in accordance with some embodiments. Wireless network may be configured to operate in accordance with one of the 3GPP standards for the Long Term Evolution (LTE) (3GPP LTE). In these embodiments, wireless network 100 may include one or more enhanced node Bs (eNBs) 104 arranged for communicating with user equipment (UE), such as UE 102. UE 102 may provide feedback 103 to an eNB 104 for performing MIMO beamforming, among other things, as described in more detail below.

In accordance with some embodiments, the UE 102 may be arranged for codebook subsampling for enhanced 4TX codebooks in a 3GPP LTE network. IN these embodiments, the UE 102 may configure a physical uplink control channel (PUCCH) for transmission of channel state information (CSI) feedback including a rank indicator (RI) and a precoding matrix (W1), may jointly encode a rank indicator (RI) and a precoding matrix (W1), and may perform codebook subsampling for the enhanced 4Tx codebook for: PUCCH report type 5 (RI/1st PMI) in PUCCH 1-1 submode 1; PUCCH report type 2c (CQI/1st PMI/2nd PMI) in PUCCH 1-1 submode 2; and PUCCH report type 1a (sub-band CQI/2nd PMI) in PUCCH 2-1. These embodiments are described in more detail below.

In some embodiments, for the PUCCH report type 5 (RI/1st PMI) in PUCCH 1-1 submode 1, when a maximum of four layers of data transmission (i.e., RI=1, 2, 3, or 4) is supported by the UE 102, the UE 102 may jointly encode the RI and the W1 by employing codebook subsampling prior to configuring the CSI transmission (e.g., see table 2-1) at least for a rank indicator of two (RI=2).

In some embodiments, precoding matrix indices of 2, 4, 6, 8, 10, 12 and 14 are used for the codebook subsampling for RI=2 when a maximum of four layers of data transmission is supported (e.g., see table 2-1) to limit the PUCCH payload size for RI feedback to 5-bits.

In some embodiments, precoding matrix indices of 0-7 are used for the codebook subsampling for RI=2 when a maximum of four layers of data transmission is supported to limit the PUCCH payload size for RI feedback to 5-bits. (e.g., see table 2-2).

In some embodiments, precoding matrix indices of 0-6 and 8-14 are used for the codebook subsampling for RI=2 when a maximum of four layers of data transmission is supported to limit the PUCCH payload size for RI feedback to 5-bits. (e.g., see table 3-1).

In some embodiments, precoding matrix indices of 0-13 are used for the codebook subsampling for RI=2 when a maximum of four layers of data transmission is supported (e.g., see table 3-1) to limit the PUCCH payload size for RI feedback to 5-bits.

In some embodiments, when a maximum of two layers of data transmission (i.e., RI=1 or 2) is supported, the RI and W1 are jointly encoded. In these embodiments, the UE 102 may refrain from performing codebook sampling (see table 1).

In some embodiments, the UE 102 may configure PUCCH payload to be 11-bits for the CSI feedback when the CSI feedback includes a channel-quality indicator (CQI) and a precoding matrix indicator (PMI). The UE 102 may configure the PUCCH payload to be 5-bits for the CSI feedback when the CSI feedback includes the RI. In these embodiments, as long as the RI is included (even without PMI), the payload should be less or equal to 5 bits.

In some embodiments, for PUCCH report type 2c (CQI/1st PMI/2nd PMI) in PUCCH 1-1 submode 2, the method comprises performing codebook subsampling for RI=1 or RI=2 in accordance with either table 4-1 or table 4-2.

In some embodiments, for PUCCH report type 1a (sub-band CQI/2nd PMI) in PUCCH 2-1, the method comprises performing codebook subsampling for RI=1, RI=2, RI=3 or RI=4 in accordance with table 5, table 6 or table 7.

In some embodiments, a dual codebook structure may be used for enhanced 4Tx codebook. Two solutions are proposed for down selection as follows:

$$W_1 = \begin{bmatrix} X_n & 0 \\ 0 & X_n \end{bmatrix} \quad \text{Solution 2a}$$

where $n = 0, 1, \ldots, 15$ $$X_n = \begin{bmatrix} 1 & 1 & 1 & 1 \\ q_1^n & q_1^{n+8} & q_1^{n+16} & q_1^{n+24} \end{bmatrix}$$

where $q_1 = e^{j2\pi/32}$

For rank 1, $$W_{2,n} \in \left\{ \frac{1}{\sqrt{2}} \begin{bmatrix} Y \\ \alpha(i)Y \end{bmatrix}, \frac{1}{\sqrt{2}} \begin{bmatrix} Y \\ j\alpha(i)Y \end{bmatrix}, \frac{1}{\sqrt{2}} \begin{bmatrix} Y \\ -\alpha(i)Y \end{bmatrix}, \frac{1}{\sqrt{2}} \begin{bmatrix} Y \\ -j\alpha(i)Y \end{bmatrix} \right\}$$

and $Y \in \{e_1, e_2, e_3, e_4\}$ and $\alpha(i) = q_1^{2(i-1)}$;

For rank 2, $$W_{2,n} \in \left\{ \frac{1}{2} \begin{bmatrix} Y_1 & Y_2 \\ Y_1 & -Y_2 \end{bmatrix}, \frac{1}{2} \begin{bmatrix} Y_1 & Y_2 \\ jY_1 & -jY_2 \end{bmatrix} \right\}$$

and $(Y_1, Y_2) = (e_i, e_k) \in \{(e_1, e_1), (e_2, e_2), (e_3, e_3),$
$(e_4, e_4), (e_1, e_2)(e_2, e_3)(e_1, e_4), (e_2, e_4)\}$;

$$W_1 = \begin{bmatrix} X_n & 0 \\ 0 & X_n \end{bmatrix} \quad \text{Solution 2b}$$

where $n = 0, 1, \ldots, 15$ $$X_n = \begin{bmatrix} 1 & 1 & 1 & 1 \\ q_1^n & q_1^{n+8} & q_1^{n+16} & q_1^{n+24} \end{bmatrix}$$

where $q_1 = e^{j2\pi/32}$

For rank 1, $$W_{2,n} \in \left\{ \frac{1}{\sqrt{2}} \begin{bmatrix} Y \\ \alpha(i)Y \end{bmatrix}, \frac{1}{\sqrt{2}} \begin{bmatrix} Y \\ j\alpha(i)Y \end{bmatrix}, \frac{1}{\sqrt{2}} \begin{bmatrix} Y \\ -\alpha(i)Y \end{bmatrix}, \frac{1}{\sqrt{2}} \begin{bmatrix} Y \\ -j\alpha(i)Y \end{bmatrix} \right\}$$

and $Y \in \{e_1, e_2, e_3, e_4\}$ and $\alpha(i) = q_1^{2(i-1)}$;

For rank 2, $W_{2,n} \in$ $$\left\{ \frac{1}{2} \begin{bmatrix} Y_1 & Y_2 \\ Y_1 & Y_2 \end{bmatrix}, \frac{1}{2} \begin{bmatrix} Y_1 & Y_2 \\ Y_1 & -Y_2 \end{bmatrix}, \frac{1}{2} \begin{bmatrix} Y_1 & Y_2 \\ -Y_1 & Y_2 \end{bmatrix}, \frac{1}{2} \begin{bmatrix} Y_1 & Y_2 \\ -Y_1 & -Y_2 \end{bmatrix} \right\}$$

$(Y_1, Y_2) \in \{(e_2, e_4)\}$ and $$W_{2,n} \in \left\{ \frac{1}{2} \begin{bmatrix} Y_1 & Y_2 \\ Y_1 & -Y_2 \end{bmatrix}, \frac{1}{2} \begin{bmatrix} Y_1 & Y_2 \\ jY_1 & -jY_2 \end{bmatrix} \right\} (Y_1, Y_2) \in$$

$\{(e_1, e_1), (e_2, e_2), (e_3, e_3), (e_4, e_4)\}$ and $$W_{2,n} \in \left\{ \frac{1}{2} \begin{bmatrix} Y_1 & Y_2 \\ Y_2 & -Y_1 \end{bmatrix} \right\} (Y_1, Y_2) \in$$

$\{(e_1, e_3), (e_2, e_4), (e_3, e_1), (e_4, e_2)\}$

Similar with 8Tx dual codebook, codebook subsampling should be applied for periodic CSI feedback to meet the PUCCH feedback channel capacity. This disclosure proposes the codebook subsampling schemes for enhanced 4Tx codebook in periodic CSI feedback.

In accordance with embodiments, in order to achieve reliable CSI feedback, the PUCCH payload should be no more than:

11 bits if current CSI feedback instance includes CQI/PMI feedback;

5 bits if current CSI feedback instance includes RI feedback.

Then codebook subsampling may be applied for: PUCCH report type 5 (RI/1$^{st}$ PMI) in PUCCH 1-1 submode 1; PUCCH report type 2c (CQI/1$^{st}$ PMI/2$^{nd}$ PMI) in PUCCH 1-1 submode 2; PUCCH report type 1a (subband CQI/2$^{nd}$ PMI) in PUCCH 2-1; for the enhanced 4Tx codebook.

Codebook Subsample for PUCCH 1-1 Submode 1:

Since the enhanced 4Tx codebook reuse Rel.8 codebook for rank 3~4 and W1 is an identity matrix, subsampling of W1 (1$^{st}$ PMI) only needs to take rank 1~2 into consideration. In order to limit the payload size of PUCCH report type 5 within 5 bits, the following scheme could be used:

Alt 1): If the UE supports maximum 2 layer transmission, no subsampling is needed. RI and W1 could be jointly encoded following table 1.

TABLE 1

| RI | W1 index after sub-sampling | No. W1 hypotheses |
|---|---|---|
| 1 | 0~15 | 16 |
| 2 | 0~15 | 16 |
| Total no. W1 + RI hypotheses across ranks 1-2 (max. layers = 2) | | 32 (5 bits) |

If the UE supported maximum layer is 4, RI and W1 could be jointly encoded following table 2-1 or table 2-2.

The principle for rank 1 is to keep as many W1 as possible. For rank 2, table 2-1 is optimized to equally subsample W1 of rank 2 for solution 2a; table 2-2 is optimized for solution 2b to avoid duplicated codewords.

Note that table 2-1 and table 2-2 could also be used as a unified solution even if UE supports maximum 2 layer transmission.

TABLE 2-1

| RI | W1 index after sub-sampling | No. W1 hypotheses |
|---|---|---|
| 1 | 0~15 | 16 |
| 2 | 0, 2, 4, 6, 8, 10, 12, 14 | 8 |
| 3 | 0 | 1 |
| 4 | 0 | 1 |
| Total no. W1 + RI hypotheses across ranks 1-4 (max. layers = 4) | | 26 (5 bits) |

TABLE 2-2

| RI | W1 index after sub-sampling | No. W1 hypotheses |
|---|---|---|
| 1 | 0~15 | 16 |
| 2 | 0~7 | 8 |
| 3 | 0 | 1 |
| 4 | 0 | 1 |
| Total no. W1 + RI hypotheses across ranks 1-4 (max. layers = 4) | | 26 (5 bits) |

Alt 2): Another alternative is the same as alt 1) except table 2-1 and table 2-2 are changed to table 3-1 and table 3-2 respectively to effectively use the 32 W1 hypotheses that could be indicated with 5 bits.

TABLE 3-1

| RI | W1 index after sub-sampling | No. W1 hypotheses |
|---|---|---|
| 1 | 0~15 | 16 |
| 2 | 0~6, 8~14 | 14 |
| 3 | 0 | 1 |
| 4 | 0 | 1 |
| Total no. W1 + RI hypotheses across ranks 1-4 (max. layers = 4) | | 32 (5 bits) |

TABLE 3-2

| RI | W1 index after sub-sampling | No. W1 hypotheses |
|---|---|---|
| 1 | 0~15 | 16 |
| 2 | 0~13 | 14 |
| 3 | 0 | 1 |
| 4 | 0 | 1 |
| Total no. W1 + RI hypotheses across ranks 1-4 (max. layers = 4) | | 32 (5 bits) |

Codebook Subsample for PUCCH 1-1 Submode 2:

Since the enhanced 4Tx codebook of rank 3~4 reuse Rel.8 codebook and W1 is an identity matrix, W2 could be indicated by 4 bits for rank 3~4. Then no subsampling is needed for PUCCH 1-1 submode 2 in rank 3~4.

For rank 1~2, the table 4-1 or table 4-2 could be used for codebook subsampling. The principle of subsampling for rank 1 is to equally distribute the DFT precoding vector within the AoD (angle of departure) range of eNB. The principle of subsampling for rank 2 is to keep all of the 2 possible co-phasing while covering eNB's AoD range with W1 as much as possible.

The definition of $e_i$ is the same, i.e. $e_i$ is a 4×1 vector with the ith component equals to 1 and the other components are zero. e.g. e1=[1 0 0 0]';

TABLE 4-1

| RI | W1 + W2 index after sub-sampling | No. W1 + W2 hypotheses |
|---|---|---|
| 1 | W1: 0, 2, 4, 6, 8, 10, 12, 14 or 1, 3, 5, 7, 9, 11, 13, 15 <br> W2: 0~15 | 128 (7 bits) |
| 2 | W1: 0, 2, 4, 6, 8, 10, 12, 14 or 1, 3, 5, 7, 9, 11, 13, 15 <br> W2: for each W1, choose only (Y1, Y2) = (e1, e1) with all 2 possible co-phasing, i.e. $$W_{2,n} \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\}, \text{with}$$ (Y1, Y2) = (e1, e1) | 8 × 2 = 16 (4 bits) |

TABLE 4-2

| RI | W1 + W2 index after sub-sampling | No.W1 + W2 hypotheses |
|---|---|---|
| 1 | W1: 0, 2, 4, 6, 8, 10, 12, 14 or 1, 3, 5, 7, 9, 11, 13, 15 <br> W2: 0~15 | 128 (7 bits) |
| 2 | W1: 0, 4, 8, 12 or 1, 5, 9, 13 or 2, 6, 10, 14 or 3, 7, 11, 15 <br> W2: for each W1, choose (Y1, Y2) = (e1, e1) with all 2 possible co-phasing, i.e. $$W_{2,n} \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\}, \text{with}$$ (Y1, Y2) = (e1, e1); and choose (Y1, Y2) = (e2, e4) with $$W_{2,n} = \left\{ \frac{1}{2}\begin{bmatrix} Y_1 & Y_2 \\ Y_1 & Y_2 \end{bmatrix} \right\};$$ and chose (Y1, Y2) = (e1, e3) with $$W_{2,n} \in \left\{ \frac{1}{2}\begin{bmatrix} Y_1 & Y_2 \\ Y_2 & -Y_1 \end{bmatrix} \right\}$$ | 4× (2 + 1 + 1) = 16 (4 bits) |

Codebook Subsample for PUCCH 2-1:

Regarding PUCCH reporting type 1a, i.e. subband CQI/second PMI reporting, the codebook subsampling of table 5 or table 6 or table 7 could be applied.

TABLE 5

| RI | W2 index after sub-sampling | No. W2 hypotheses |
|---|---|---|
| 1 | 0~15 | 16 (4 bits) |
| 2 | W2: for each W1, choose (Y1, Y2) ∈ {(e1, e1), (e2, e2)} with all 2 possible co-phasing, i.e. $$W_{2,n} \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\}, \text{with}$$ (Y1, Y2)∈ {(e1, e1), (e3, e3)} | 2 × 2 = 4 (2 bits) |
| 3 | 0, 4, 8, 12 or 1, 5, 9, 13 or 2, 6, 10, 14 or 3, 7, 11, 15 or 0, 1, 2, 3 | 4 (2 bits) |
| 4 | 0, 4, 8, 12 or 1, 5, 9, 13 or 2, 6, 10, 14 or 3, 7, 11, 15 or 0, 1, 2, 3 | 4 (2 bits) |

TABLE 6

| RI | W2 index after sub-sampling | No. W2 hypotheses |
|---|---|---|
| 1 | 0~15 | 16 (4 bits) |
| 2 | W2: for each W1, choose (Y1, Y2)∈ {(e1, e1), (e2, e2), (e3, e3), (e4, e4)} with only 1 co-phasing, i.e. $W_{2,n} \in \left\{ \frac{1}{2}\begin{bmatrix} Y_1 & Y_2 \\ Y_1 & -Y_2 \end{bmatrix} \right\}$ with (Y1, Y2)∈ {(e1, e1), (e2, e2), (e3, e3), (e4, e4)} | 4 × 1 = 4 (2 bits) |
| 3 | 0, 4, 8, 12 or 1, 5, 9, 13 or 2, 6, 10, 14 or 3, 7, 11, 15 or 0, 1, 2, 3 | 4 (2 bits) |
| 4 | 0, 4, 8, 12 or 1, 5, 9, 13 or 2, 6, 10, 14 or 3, 7, 11, 15 or 0, 1, 2, 3 | 4 (2 bits) |

TABLE 7

| RI | W2 index after sub-sampling | No. W2 hypotheses |
|---|---|---|
| 1 | 0~15 | 16 (4 bits) |
| 2 | W2: for each W1, choose (Y1, Y2) = (e1, e1) with all 2 possible co-phasing, i.e. $W_{2,n} \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\}$, with (Y1, Y2) = (e1, e1); and choose (Y1, Y2) = (e2, e4) with $W_{2,n} = \left\{ \frac{1}{2}\begin{bmatrix} Y_1 & Y_2 \\ Y_1 & Y_2 \end{bmatrix} \right\}$; and chose (Y1, Y2) = (e1, e3) with $W_{2,n} \in \left\{ \frac{1}{2}\begin{bmatrix} Y_1 & Y_2 \\ Y_2 & -Y_1 \end{bmatrix} \right\}$ | 2 + 1 + 1 = 4 (2 bits) |
| 3 | 0, 4, 8, 12 or 1, 5, 9, 13 or 2, 6, 10, 14 or 3, 7, 11, 15 or 0, 1, 2, 3 | 4 (2 bits) |
| 4 | 0, 4, 8, 12 or 1, 5, 9, 13 or 2, 6, 10, 14 or 3, 7, 11, 15 or 0, 1, 2, 3 | 4 (2 bits) |

Figure 2:
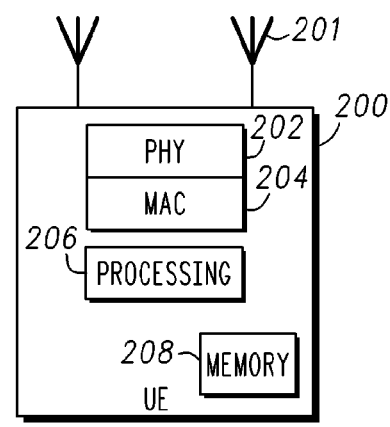
FIG. 2 illustrates a functional block diagram of user equipment (UE) in accordance with some embodiments.

FIG. 2 illustrates a functional block diagram of a UE in accordance with some embodiments. UE 200 may be suitable for use as UE 102 (FIG. 1). The UE 200 comprises certain transceiver circuitry that comprises physical layer circuitry 202 for transmitting and receiving signals to and from eNBs 104 (FIG. 1) using one or more antennas 201. The transceiver circuitry of UE 200 may also include medium access control layer (MAC) circuitry 204 for controlling access to the wireless medium. UE 200 may also include processing circuitry 206 and memory 208 arranged to perform the operations described herein.

In some embodiments, the UE 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 200 may include one or more of a keyboard, a display, a non-volatile memory port, multiple antennas, a graphics processor, an application processor, speakers, and other mobile device elements. The display may be an LCD screen including a touch screen.

The one or more antennas 201 utilized by the UE 200 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to 1/10 of a wavelength or more.

Although the UE 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the UE 200 may be configured to receive OFDM communication signals over a multicarrier communication channel in accordance with an OFDMA communication technique. The OFDM signals may comprise a plurality of orthogonal subcarriers. In some broadband multicarrier embodiments, eNBs (including macro eNB 104 and pico eNBs) may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the invention is not limited in this respect. In these broadband multicarrier embodiments, the UE 200 and the eNBs may be configured to communicate in accordance with an orthogonal frequency division multiple access (OFDMA) technique.

In some LTE embodiments, the basic unit of the wireless resource is the Physical Resource Block (PRB). The PRB may comprise 12 sub-carriers in the frequency domain×0.5 ms in the time domain. The PRBs may be allocated in pairs (in the time domain). In these embodiments, the PRB may comprise a plurality of resource elements (REs). A RE may comprise one sub-carrier×one symbol.

Two types of reference signals may be transmitted by an eNB including demodulation reference signals (DM-RS), channel state information reference signals (CIS-RS) and/or a common reference signal (CRS). The DM-RS may be used by the UE for data demodulation. The reference signals may be transmitted in predetermined PRBs.

In some embodiments, the OFDMA technique may be either a frequency domain duplexing (FDD) technique that uses different uplink and downlink spectrum or a time-domain duplexing (TDD) technique that uses the same spectrum for uplink and downlink.

In some other embodiments, the UE 200 and the eNBs may be configured to communicate signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some LTE embodiments, the UE 200 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNB may be based on the CQI. The PMI may be a vector that is calculated by the UE and reported to the eNB. In some embodiments, the UE may transmit a physical uplink control channel (PUCCH) of format 2, 2a or 2b containing the CQI/PMI or RI.

In these embodiments, the CQI may be an indication of the downlink mobile radio channel quality as experienced by the UE 200. The CQI allows the UE 200 to propose to an eNB an optimum modulation scheme and coding rate to use for a given radio link quality so that the resulting transport block error rate would not exceed a certain value, such as 10%. In some embodiments, the UE may report a wideband CQI value which refers to the channel quality of the system bandwidth. The UE may also report a sub-band CQI value per sub-band of a certain number of resource blocks which may be configured by higher layers. The full set of sub-bands may cover the system bandwidth. In case of spatial multiplexing, a CQI per code word may be reported.

In some embodiments, the PMI may indicate an optimum precoding matrix to be used by the eNB for a given radio condition. The PMI value refers to the codebook table. The network configures the number of resource blocks that are represented by a PMI report. In some embodiments, to cover the system bandwidth, multiple PMI reports may be provided. PMI reports may also be provided for closed loop spatial multiplexing, multi-user MIMO and closed-loop rank 1 precoding MIMO modes.

In some cooperating multipoint (CoMP) embodiments, the network may be configured for joint transmissions to a UE in which two or more cooperating/coordinating points, such as remote-radio heads (RRHs) transmit jointly. In these embodiments, the joint transmissions may be MIMO transmissions and the cooperating points are configured to perform joint beamforming.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. User Equipment (UE) configured for periodic physical uplink control channel (PUCCH) channel-state information (CSI) reporting, the UE comprising:

processing circuitry configured for periodic CSI reporting in accordance with a plurality of PUCCH reporting types for four antenna ports, the PUCCH reporting types for the four antenna ports including a PUCCH reporting type 1a for reporting a subband channel quality indicator (CQI) and a second precoding matrix indicator (PMI), a PUCCH reporting type 2c for reporting a wideband CQI and a first PMI and a second PMI, and a PUCCH reporting type 5 for reporting a rank indicator (RI) and a first PMI; and transceiver circuitry configured to transmit the CSI report on the PUCCH in accordance with the configured PUCCH reporting type, wherein for the PUCCH reporting types, a subsampled four transmit antenna (4TX) codebook is applied for jointly coding reporting for at least some of the PUCCH reporting types for the four antenna ports, wherein the processing circuitry is configured for periodic PUCCH CSI reporting in accordance with one of a plurality of reporting modes, the reporting modes indicating a CQI feedback type and a PMI feedback type, the reporting modes including a reporting mode PUCCH 1-1 and reporting mode PUCCH 2-1, wherein when configured for reporting mode PUCCH 1-1, the processing circuitry is configured to jointly code the rank indicator (RI) and the first precoding matrix indicator (PMI) using the subsampled 4TX codebook, wherein for the PUCCH reporting type 5 when configured for reporting mode PUCCH 1-1:

the processing circuitry is configured to jointly code the RI and the first PMI using a sub-sampled codebook, the first PMI corresponding to a set of precoding matrices selected from a first codebook subset based on the sub-sampled 4TX codebook, and the transceiver circuitry is configured to transmit a type 5 report on the PUCCH, the type 5 report including the jointly coded RI and the first PMI, and wherein when configured for PUCCH reporting type 2c:
the processing circuitry is configured to:

select a single precoding matrix from the codebook subset, the first PMI corresponding to a set of precoding matrices selected from a second codebook subset based on the sub-sampled 4TX codebook, and calculate a single wideband CQI value from the selected single precoding matrix, and the transceiver circuitry is configured to transmit a type 2c report on the PUCCH that includes the single wideband CQI, and wideband first and second PMIs corresponding to the selected single precoding matrix, in a first subframe.

2. The UE of claim 1 wherein the processing circuitry is configured to perform codebook subsampling of the 4TX codebook for the PUCCH reporting type 5 when configured for reporting mode PUCCH 1-1.

3. The apparatus of claim 1 wherein when configured for PUCCH reporting type 1a:
the processing circuitry is to select a subband of system bandwidth, and select a second PMI from third a codebook subset based on transmission over the selected subband, and
the transceiver circuitry is to transmit the type 1a report on the PUCCH that includes the CQI value related to the selected subband and the second PMI in a second subframe.

4. The UE of claim 1 wherein the processing circuitry is to configure the transceiver circuitry for either two or four-layer spatial multiplexing when the UE is configured for the PUCCH reporting type 5.

5. The UE of claim 1 wherein:
the PUCCH reporting type 1a supports subband CQI and second PMI feedback for the four antenna ports,
the PUCCH reporting type 2c supports wideband CQI and full PMI feedback for the four antenna ports, and
the PUCCH reporting type 5 supports RI and first PMI feedback for the four antenna ports configured for two and four layer spatial multiplexing.

6. The UE of claim 1 wherein when the UE is further configured for transmission on four antenna ports (4TX), the processing circuitry is configured to perform codebook subsampling for:
the PUCCH reporting type 5 when configured for reporting mode PUCCH 1-1;
the PUCCH reporting type 2c when configured for reporting mode PUCCH 1-1; and
the PUCCH reporting type 1a when configured for reporting mode PUCCH 2-1.

7. The UE of claim 1 wherein for the PUCCH reporting type 5 in reporting mode PUCCH 1-1 submode 1, when a maximum of four layers of data transmission is supported by the UE, the processing circuitry is to jointly code the RI and the second PMI by employing the subsampled 4TX codebook prior to configuring the report for a rank indicator of two.

8. The UE of claim 7 wherein when a maximum of two layers of data transmission is supported by the UE, the processing circuitry is further configured to jointly code the RI and the second PMI without use of a subsampled codebook.

9. A non-transitory computer-readable storage medium that stores instructions for execution by one or more processors of a user equipment (UE) to configure the UE to perform operations for periodic physical uplink control channel (PUCCH) channel-state information (CSI) reporting to:
configure the UE for periodic CSI reporting in accordance with a plurality of PUCCH reporting types for four antenna ports, the PUCCH reporting types for the four antenna ports including a PUCCH reporting type 1a for reporting a subband channel quality indicator (CQI) and a second precoding matrix indicator (PMI), a PUCCH reporting type 2c for reporting a wideband CQI and a first PMI and a second PMI and a PUCCH reporting type 5 for reporting a rank indicator (RI) and a first PMI; and encode a report for transmission on the PUCCH in accordance with the configured PUCCH reporting type,
wherein for the PUCCH reporting types, a subsampled four transmit antenna (4TX) codebook is applied for jointly coding reporting for at least some of the PUCCH reporting types for the four antenna ports,
wherein the UE is further configured for periodic PUCCH CSI reporting in accordance with one of a plurality of reporting modes, the reporting modes indicating a CQI feedback type and a PMI feedback type, the reporting modes including a reporting mode PUCCH 1-1 and reporting mode PUCCH 2-1,
wherein when configured for reporting mode PUCCH 1-1, the UE is to jointly code the rank indicator (RI) and the first precoding matrix indicator (PMI) using the subsampled 4TX codebook,
wherein for the PUCCH reporting type 5 when configured for reporting mode PUCCH 1-1:
the UE is to jointly code the RI and the first PMI using a sub-sampled codebook, the first PMI corresponding to a set of precoding matrices selected from a first codebook subset based on the sub-sampled 4TX codebook, and
to transmit a type 5 report on the PUCCH, the type 5 report including the jointly coded RI and the first PMI, and
wherein when configured for PUCCH reporting type 2c:
the UE is to:
select a single precoding matrix from the codebook subset, the first PMI corresponding to a set of precoding matrices selected from a second codebook subset based on the sub-sampled 4TX codebook, and calculate a single wideband CQI value from the selected single precoding matrix, and
the transceiver circuitry is to transmit a type 2c report on the PUCCH that includes the single wideband CQI, and wideband first and second PMIs corresponding to the selected single precoding matrix, in a subframe.

10. The non-transitory computer-readable storage medium of claim 9 wherein the UE is configured to perform codebook subsampling of the 4TX codebook for the PUCCH reporting type 5 when configured for reporting mode PUCCH 1-1.

11. A method for periodic physical uplink control channel (PUCCH) channel-state information (CSI) reporting performed by user equipment (UE), the method comprising:
performing periodic CSI reporting in accordance with a plurality of PUCCH reporting types for four antenna ports, the PUCCH reporting types for the four antenna ports including a PUCCH reporting type 1a for reporting a subband channel quality indicator (CQI) and a second precoding matrix indicator (PMI), a PUCCH reporting type 2c for reporting a wideband CQI and a first PMI and a second PMI, and a PUCCH reporting type 5 for reporting a rank indicator (RI) and a first PMI; and
encoding a report for transmission on the PUCCH in accordance with the configured PUCCH reporting type,
wherein for the PUCCH reporting types, a subsampled four transmit antenna (4TX) codebook is applied for jointly coding reporting for at least some of the PUCCH reporting types for the four antenna ports,
wherein processing circuitry of the UE is configured for periodic PUCCH CSI reporting in accordance with one of a plurality of reporting modes, the reporting modes indicating a CQI feedback type and a PMI feedback type, the reporting modes including a reporting mode PUCCH 1-1 and reporting mode PUCCH 2-1, wherein when configured for reporting mode PUCCH 1-1, the processing circuitry is to jointly code the rank indicator (RI) and the first precoding matrix indicator (PMI) using the subsampled 4TX codebook, wherein for the PUCCH reporting type 5 when configured for reporting mode PUCCH 1-1:

the processing circuitry is to jointly code the RI and the first PMI using a sub-sampled codebook, the first PMI corresponding to a set of precoding matrices selected from a first codebook subset based on the sub-sampled 4TX codebook, and transceiver circuitry of the UE is to transmit a type 5 report on the PUCCH, the type 5 report including the jointly coded RI and the first PMI, and wherein when configured for PUCCH reporting type 2c:

the processing circuitry is to:

select a single precoding matrix from the codebook subset, the first PMI corresponding to a set of precoding matrices selected from a second codebook subset based on the sub-sampled 4TX codebook, and calculate a single wideband CQI value from the selected single precoding matrix, and the transceiver circuitry is to transmit a type 2c report on the PUCCH that includes the single wideband CQI, and wideband first and second PMIs corresponding to the selected single precoding matrix, in a subframe.

\* \* \* \* \*

UNITED STATES PATENT AND TRADEMARK OFFICE
CERTIFICATE OF CORRECTION

PATENT NO. : 9,553,643 B2
APPLICATION NO. : 14/739815
DATED : January 24, 2017
INVENTOR(S) : Chen et al.

It is certified that error appears in the above-identified patent and that said Letters Patent is hereby corrected as shown below:

In the Claims

In Column 10, Line 21, in Claim 1, after "with", insert --one of--

In Column 10, Line 37, in Claim 1, after "is", insert --further--

In Column 10, Line 53, in Claim 1, after "a", delete "first"

In Column 10, Line 62, in Claim 1, after "a", delete "second"

In Column 10, Line 65, in Claim 1, after "matrix,", delete "and"

In Column 11, Line 3, in Claim 1, delete "subframe." and insert --subframe; and
wherein when configured for PUCCH reporting type 1a:
the processing circuitry is configured to select a subband of system bandwidth, and select a second PMI from a codebook subset based on transmission over the selected subband, and the transceiver circuitry is configured to transmit the type 1a report on the PUCCH that includes the CQI value related to the selected subband and the second PMI in a second subframe.-- therefor In Column 11, Line 11, in Claim 3, after "from", delete "third"

In Column 11, Line 16, in Claim 3, after "a", delete "second"

In Column 11, Line 30, in Claim 6, after "is", delete "further"

In Column 11, Line 49, in Claim 8, after "is", delete "further"

In Column 11, Line 59, in Claim 9, after "with", insert --one of--

Signed and Sealed this
Twenty-fifth Day of June, 2019

Andrei Iancu
*Director of the United States Patent and Trademark Office*

CERTIFICATE OF CORRECTION (continued)
U.S. Pat. No. 9,553,643 B2

In Column 12, Line 7, in Claim 9, after "is", delete "further"

In Column 12, Line 15, in Claim 9, after "is", insert --configured--

In Column 12, Line 20, in Claim 9, after "is", insert --configured--

In Column 12, Line 22, in Claim 9, after "a", delete "first"

In Column 12, Line 25, in Claim 9, before "to", insert --the UE is configured--

In Column 12, Line 32, in Claim 9, after "a", delete "second"

In Column 12, Line 36, in Claim 9, delete "tranceiver circuitry is" and insert --UE is configured-- therefor In Column 12, Line 48, in Claim 11, after "with", insert --one of--

In Column 12, Line 64, in Claim 11, after "wherein", insert --the--

In Column 12, Line 64, in Claim 11, delete "of the UE is" and insert --is further-- therefor In Column 13, Line 4, in Claim 11, after "is", insert --configured--

In Column 13, Line 9, in Claim 11, after "is", insert --configured--

In Column 13, Line 12, in Claim 11, after "a", delete "first"

In Column 13, Line 14, in Claim 11, before "transceiver", insert --the--

In Column 13, Line 14, in Claim 11, delete "of the UE is" and insert --is configured-- therefor In Column 13, Line 21, in Claim 11, after "a", delete "second"

In Column 13, Line 25, in Claim 11, after "is", insert --configured--